United States Patent
Marquardt (10) Patent No.: US 7,902,774 B2
(45) Date of Patent: Mar. 8, 2011

(54) POWER ELECTRONIC CIRCUIT ARRANGEMENT FOR A ROTATING FIELD MACHINE

(75) Inventor: Rainer Marquardt, Riemerling (DE)

(73) Assignee: RENK Aktiengesellschaft, Augsburg (DE)

( * ) Notice: Subject to any disclaimer, the term of this patent is extended or adjusted under 35 U.S.C. 154(b) by 401 days.

(21) Appl. No.: 12/077,890

(22) Filed: Mar. 21, 2008

(65) Prior Publication Data

US 2008/0272718 A1 Nov. 6, 2008

(30) Foreign Application Priority Data

Mar. 21, 2007 (DE) .......................... 10 2007 013 462

(51) Int. Cl.
*H02P 1/00* (2006.01)
(52) U.S. Cl. ......................... 318/139; 318/800
(58) Field of Classification Search .................. 318/139; 388/800; 320/105; 324/133
See application file for complete search history.

(56) References Cited

U.S. PATENT DOCUMENTS 6,130,519 A * 10/2000 Whiting et al. ............... 320/105

* cited by examiner

Primary Examiner — Karen Masih
(74) Attorney, Agent, or Firm — Cohen Pontani Lieberman & Pavane LLP (57) ABSTRACT

A power electronic circuit arrangement includes functional blocks for controllable, bidirectional energy exchange between a rotating field machine with at least one phase winding and an external energy store with one positive terminal and one negative terminal. At least one functional block is designed as a functional block that is connection-compatible on the power side and includes at least one internal energy store, such that this functional block has at least one additional switching state, in which an output voltage ($U_{x2}$) is more positive than the positive terminal (P) of the external energy store, and/or in which an output voltage ($U_{x2}$) is more negative than the negative terminal (N) of the external energy store.

19 Claims, 4 Drawing Sheets

POWER ELECTRONIC CIRCUIT ARRANGEMENT FOR A ROTATING FIELD MACHINE

BACKGROUND OF THE INVENTION

1. Field of the Invention

The present invention concerns a power electronic circuit arrangement for a rotating field machine.

2. Description of the Related Art

Electric drive systems with rotating field machines, especially with permanently excited synchronous machines, have already reached a high state of development. Their advantage is that their high specific force densities allow high starting torques and, at the same time, low weight. In this connection, the efficiencies of the total drive system that are realized in this way and the power density depend to a great extent on the power electronic supply.

Figure 1:
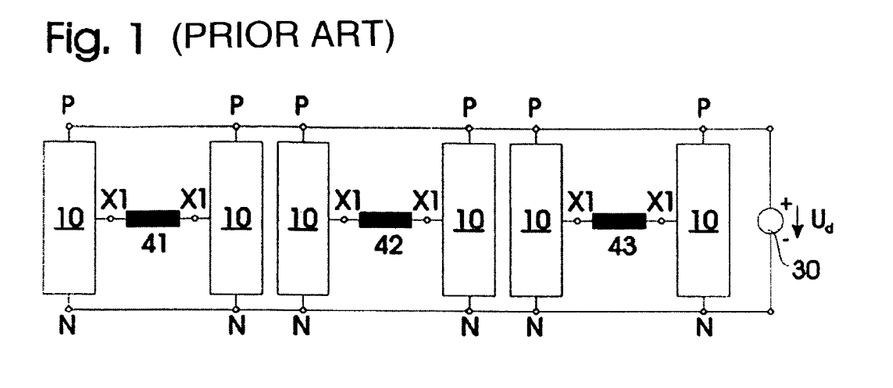
FIG. 1 shows a first in-house prior art power electronic circuit arrangement.
Figure 2:
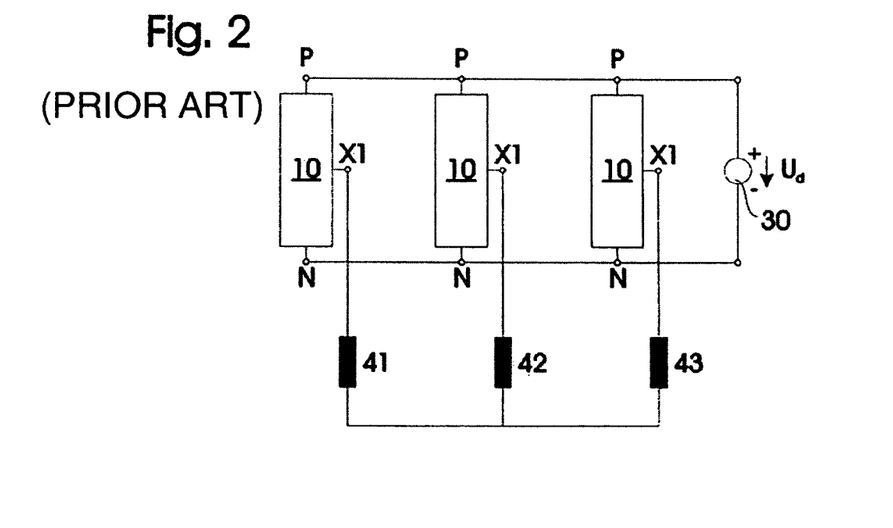
FIG. 2 shows a second in-house prior art power electronic circuit arrangement.

Various power electronic circuit arrangements for this are already known from our own in-house prior art. For example, FIG. 1 shows an arrangement in which three phase windings 41-43 of a permanently excited synchronous machine that is connected to a DC voltage source 30 can be controlled independently of one another by means of power electronic functional blocks 10. FIG. 2 shows an arrangement using functional blocks 10, in which the individual phase windings 41-43 cannot be controlled independently of one another.

Figure 3:
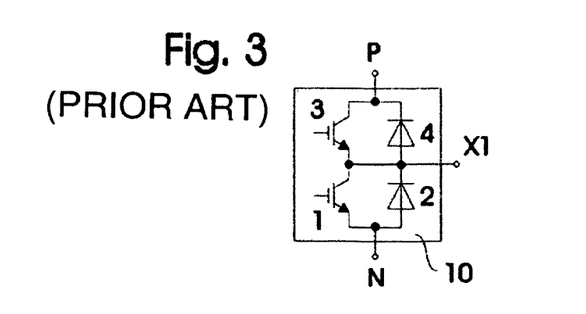
FIG. 3 shows a functional block of the power electronic circuit arrangement according to FIG. 1 or FIG. 2.
Figure 4:
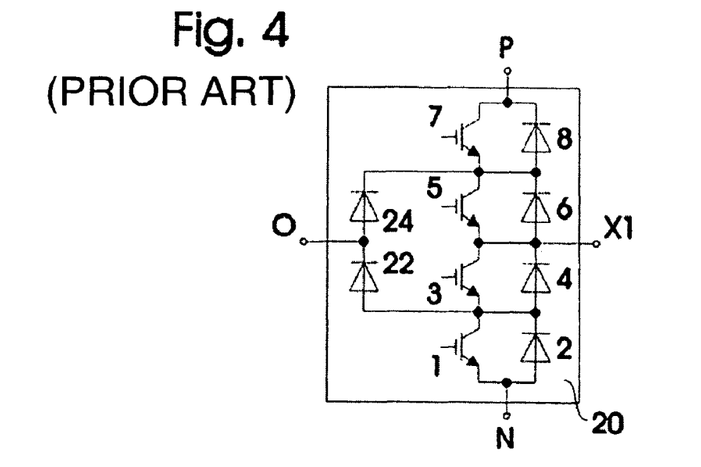
FIG. 4 shows a functional block of an in-house prior art modification of the power electronic circuit arrangement according to FIG. 1 or FIG. 2.

In this connection, FIG. 3 shows the layout of a functional block 10 from FIG. 1 or FIG. 2 in two-point connection as a so-called half-bridge circuit with two controllable electronic switches 1, 3 and two antiparallel diodes 2, 4. Alternatively, multipoint circuits can also be used. As an example, FIG. 4 shows the layout of a functional block 20 in three-point connection with four controllable electronic switches 1, 3, 5, 7, four antiparallel diodes 2, 4, 6, 8, and two additional diodes 22, 24.

Basic circuits of these types make it possible to operate the synchronous machine both as a motor, in which case electric energy from an external energy store, such as a DC voltage source, is converted to mechanical work in the synchronous machine, and as a generator, in which case mechanical work performed on the synchronous machine is stored as electric energy in the external energy store. To this end, the external store, for example, in the form of a storage battery, can be discharged (motor operation) or charged (generator operation).

This makes it possible, for example, to recover energy during mechanical braking. Likewise, in hybrid systems, the time-variant difference between the power demanded from the drive system and the power made available by an internal combustion engine can be compensated.

SUMMARY OF THE INVENTION

One of the objectives of the present invention is to make available a power electronic circuit arrangement for a rotating field machine that allows more efficient operation of the rotating field machine.

A power electronic circuit arrangement in accordance with one embodiment of the present invention includes one or more functional blocks for controllable, bidirectional energy exchange between a rotating field machine with at least one phase winding, preferably with several phase windings, and especially with three phase windings, and an external energy store that has one positive and one negative terminal. One or more functional blocks can each include a two-point circuit. Additionally or alternatively, one or more other functional blocks can each include a multipoint circuit.

At least one functional block is designed as a functional block that is connection-compatible on the power side and includes at least one internal energy store. This functional block that is connection-compatible on the power side has at least one additional switching state, in which an output voltage is more positive than the positive terminal of the external energy store. Additionally or alternatively, this functional block that is connection-compatible on the power side has at least one additional switching state, in which an output voltage is more negative than the negative terminal of the external energy store.

Due to the internal energy store, which preferably includes one or more unipolar storage capacitors connected in series or in parallel, at least one additional switching state can be obtained, in which an output voltage of the functional block that is connection-compatible on the power side has a greater absolute value than the respective terminal of the external energy store.

The additional degree of freedom created by the additional switching state, in which an output voltage is more positive than the positive terminal or more negative than the negative terminal of the external energy store, allows significantly more efficient operation of the rotating field machine.

In an embodiment of the invention that is especially preferred, a functional block that is connection-compatible on the power side has at least two additional switching states compared to the arrangement described with reference to FIG. 3 and thus at least four possible output voltage values all together. In this regard, in one of the additional switching states, an output voltage is more positive than the positive terminal of the external energy store, and in the other additional switching state, an output voltage is more negative than the negative terminal of the external energy store. This allows especially highly utilized permanently excited synchronous machines to be operated especially efficiently.

A rotating field machine that is optimized with respect to weight and/or space requirement has a low series inductance. This requires a high switching frequency (so-called "pulse frequency") of the power electronics or the multipoint circuits in order to limit undesired current ripples of the phase winding currents. In the case of the arrangement described with reference to FIG. 4, the three-point connection is often not adequate for this, which has the disadvantage of increasing the technical complexity.

At the same time, a desired high power utilization of a rotating field machine requires, at least temporarily, high phase winding currents. Therefore, despite the low series inductance, there is an increase in the total voltage requirement at the basic frequency of the rotating field machine with respect to the active component of the voltage. This also has an unfavorable effect on the efficiency of previously known arrangements and the disadvantage of increasing their technical complexity, since a high direct voltage and/or a small number of turns for the stator winding must be selected accordingly. The latter leads to undesirably high phase winding currents.

These disadvantages can be diminished by a power electronic circuit arrangement in accordance with an embodiment of the present invention. The additional degrees of freedom allow control that is better adapted and thus more efficient operation of a rotating field machine of this type.

In real applications, DC voltage sources are often equipped with parallel-connected filter capacitors in order to carry the high-frequency current components of the power electronics. The aforementioned reduced efficiency of previously known arrangements due to a high direct voltage and/or a small number of turns for the stator winding in this respect represents an unfavorable power factor, which results, in previously known arrangements, in a higher effective current load and/or filter capacitors with larger dimensions.

This situation can be remedied by the additional degrees of freedom of a power electronic circuit arrangement in accordance with an embodiment of the present invention.

In the prior art circuit arrangements explained above with reference to FIGS. 1-4, a short circuit of the DC voltage source 30 results in an uncontrolled overload current in the phase windings 41-43. This generates high braking torques, which can overload and damage the synchronous machine and/or the drive system components connected with it (for example, a transmission, an internal combustion engine, or a hybrid drive). Similar problems also arise when the voltage $U_d$ of the DC voltage source drops significantly below its rated voltage, for example, due to high loads by other consumers.

These problems can be prevented in a well-known way by mechanical uncoupling of the rotating field machine. On the other hand, as will be described in greater detail below with reference to specific embodiments, power electronic circuit arrangement according to one embodiment of the present invention can be switched in such a way that the problems explained above in the event of a short circuit in the external energy store or in the event of a voltage drop of the external energy store under its rated voltage are avoided.

The external energy store preferably comprises one or more rechargeable storage batteries. Additionally or alternatively, the external energy store can comprise, for example, one or more parallel-connected or series-connected fuel cell batteries. Likewise, the external energy store can also include a DC voltage network.

As will be described in greater detail below with reference to various specific embodiments, the basic structure of a previously known power electronic circuit arrangement can be advantageously retained, such that, depending on requirements, several or all functional blocks are replaced by functional blocks which are connection-compatible on the power side and which comprise at least one internal energy store and have at least one additional switching state, in which an output voltage is more positive than the positive terminal of the external energy store or more negative than the negative terminal of the external energy store. One, more than one, or all of the functional blocks that are connection-compatible on the power side preferably have at least one additional switching state, in which an output voltage is more positive than the positive terminal of the external energy store, and at least one other additional switching state, in which an output voltage is more negative than the negative terminal of the external energy store.

To be sure, functional blocks of the present invention that are connection-compatible on the power side require slightly greater technical complexity than previously known functional blocks, such as those described with reference to FIG. 3. On the other hand, however, these functional blocks that are connection-compatible on the power side offer more degrees of freedom of open-loop and/or closed-loop control and have overall greater functionality, which allows more efficient operation of the rotating field machine. Therefore, suitable replacement of one, more than one, or all functional blocks of previously known design by functional blocks of the present invention that are connection-compatible on the power side makes it possible, depending on the desired multiplicity of control, to choose an optimum compromise between the increased technical complexity that results from this replacement and the improved efficiency that can be realized by this replacement. This also enhances the freedom of configuration in the design of the power electronic circuit arrangement.

It is especially advantageous to use a power electronic circuit arrangement in accordance with one embodiment of the present invention for the controllable, bidirectional energy exchange between a permanently excited, highly utilized synchronous machine and a DC voltage source (30).

The voltage of the internal energy store is preferably subject to variable open-loop or closed-loop control as a function of the rotational speed and/or the torque of the rotating field machine. The power electronic circuit arrangement can include a suitable control element for this purpose. For example, the control element can automatically control the voltage $U_C$ of the internal energy store to a desired value $U_{C,set}$, which varies as a function of the rotational speed and/or the torque of the rotating field machine. At a rotational speed or a torque that is equal or close to zero, this desired value $U_{C,set}$ is preferably also essentially equal to zero. For example, the desired value can obey an equation of the form $$U_{C,set} = \Sigma(c_i \times N^i)$$

where:
  $c_i$ (i=1 ... n): constants and
  N: the rotational speed or the torque.

This has the advantageous effect of minimizing the current ripples during a shutdown or at low rotational speeds of the rotating field machine and, in addition, can make precharging of the internal energy store superfluous.

In preferred dimensioning of the present invention, a permissible voltage of the internal energy store is selected in such a way that, in the event of a short circuit and/or an undervoltage of the external energy store, uncontrolled or excessive braking of the rotating field machine does not occur. The above-described stresses on the rotating field machine and drive elements connected to it, such as transmissions, internal combustion engines, pumps, or the like, due to uncontrolled acceleration torques or prolonged short-circuit currents, which arise during a disruption, can thus be prevented.

In a functional block that is connection-compatible on the power side in accordance with the present invention, an asymmetrically blocking IGBT and/or a reverse-conducting component, especially a MOSFET and/or CoolMOS, can be used as the controllable electronic switch. Since this switch does not need to have any blocking capability in the reverse direction, it is advantageous to use modern, loss optimized components such as those mentioned above.

Let us call special attention again to some of the advantages. First, more efficient operation of the rotating field machine is realized. Second, the possible operating range is expanded to higher rotational speeds with increased torques. Third, the operation at relatively low and/or strongly fluctuating DC voltages ($U_d$) is improved. Fourth, in the event of undervoltage or short circuit ($U_d$=0) of the supply DC voltage ($U_d$), disruptive braking torques or acceleration torques can be avoided.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless

DETAILED DESCRIPTION OF THE PRESENTLY PREFERRED EMBODIMENTS

FIG. 1 shows a first in-house prior art power electronic circuit arrangement for supplying a permanently excited synchronous machine with a voltage $U_d$ from a DC voltage source 30 in the form of a storage battery. The synchronous machine, details of which are not otherwise shown, includes three phase windings 41, 42, and 43. Two functional blocks 10, which will be explained in greater detail below with reference to FIG. 3, are assigned to each phase winding. This arrangement allows mutually independent control of the individual phase winding currents. The arrangement also allows the rotating field machine to be operated both as a motor and as a generator, i.e., in both energy directions.

FIG. 2 shows a second in-house prior art power electronic circuit arrangement. Elements of the same design as those of the first in-house prior art power electronic circuit arrangement of FIG. 1 are identified by the same reference symbols, so that the following discussion deals only with the differences from the circuit arrangement according to FIG. 1.

In the second in-house power electronic circuit arrangement according to FIG. 2, which is known as a "three-phase indirect ac converter", only one functional block 10 is assigned to each phase winding 41, 42, and 43. The arrangement shown in FIG. 2 thus no longer allows independent control of the phase winding currents, but it reduces the design complexity.

FIG. 3 shows a functional block 10 of the first or second in-house prior art power electronic circuit arrangement according to FIG. 1 or FIG. 2. The functional block is designed as a two-point circuit. It comprises two controllable electronic switches 1 and 3 and two antiparallel diodes 2 and 4 in the circuit shown in FIG. 3. "P" designates the positive terminal of the external energy store 30 or a positive terminal that can be connected with it, and "N" designates the negative terminal of the external energy store 30 or a negative terminal that can be connected with it. "X1" designates a power terminal of the functional block 10, which can be connected with a terminal of a phase winding 41, 42, or 43 of the rotating field machine.

FIG. 4 shows a modification 20 of the functional block 10 of the first or second in-house prior art power electronic circuit arrangement according to FIG. 1 or FIG. 2. This modification 20 is designed as a three-point circuit. Elements of the same design are again identified by the same reference symbols, so that the following discussion deals only with the differences from the functional block 10 according to FIG. 3.

The modification 20 of the functional block 10 can be used instead of functional block 10 in the power electronic circuit arrangement according to FIG. 1 or FIG. 2. It comprises a total of four controllable electronic switches 1, 3, 5, 7, four antiparallel diodes 2, 4, 6, 8, and two additional diodes 22, 24 in the circuit shown in FIG. 4.

Since these circuit arrangements and functional blocks are already well known and serve only to illustrate the disadvantages of the prior art, they do not need to be explained in greater detail.

Figure 7:
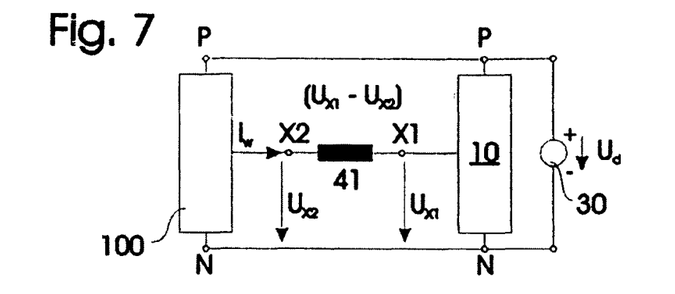
FIG. 7 shows a power electronic circuit arrangement in accordance with a first embodiment of the present invention.
Figure 8:
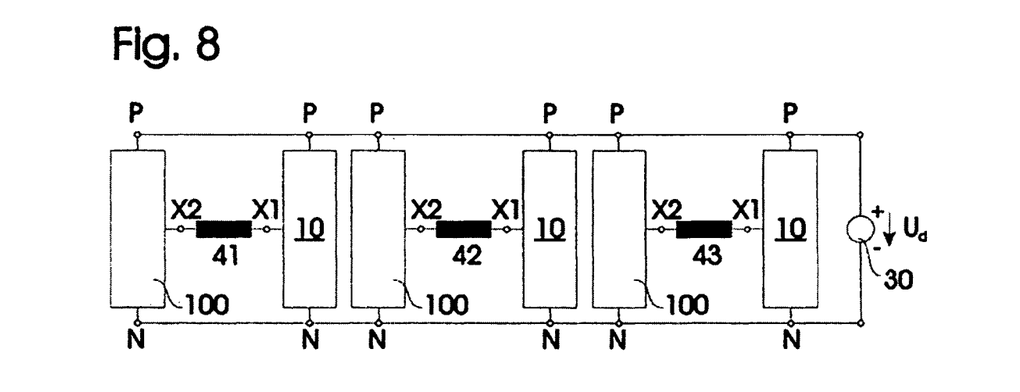
FIG. 8 shows a power electronic circuit arrangement in accordance with a second embodiment of the present invention.
Figure 9:
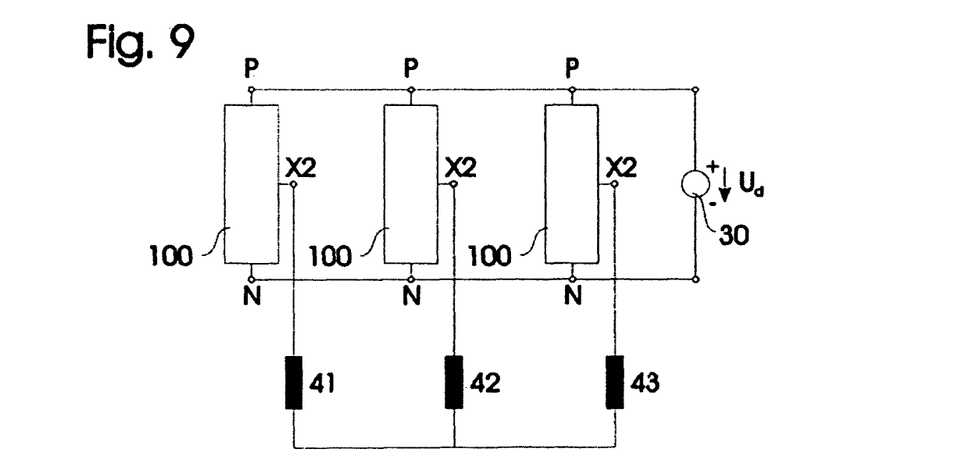
FIG. 9 shows a power electronic circuit arrangement in accordance with a third embodiment of the present invention.
Figure 10:
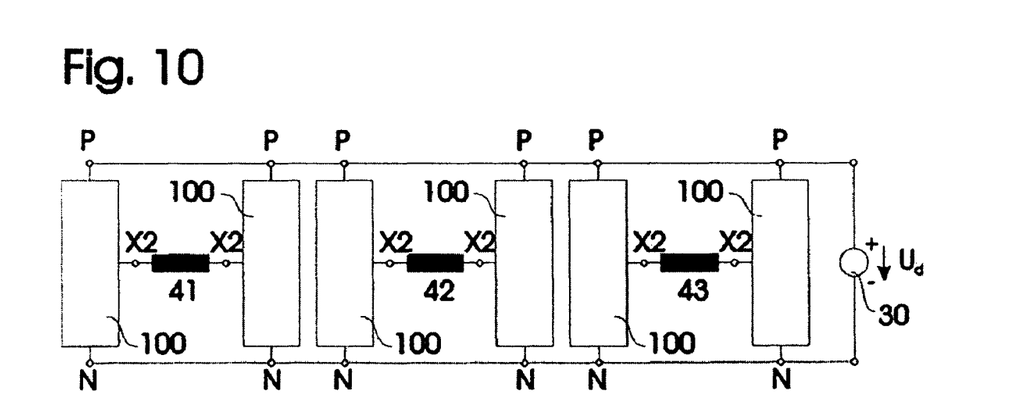
FIG. 10 shows a power electronic circuit arrangement in accordance with a fourth embodiment of the present invention.

FIGS. 7 to 10 show power electronic circuit arrangements that correspond partly to FIG. 1 and partly to FIG. 2. In these power electronic circuit arrangements in accordance with the invention, half of the functional blocks 10 or 20 have been replaced by a functional block 100 that is connection-compatible on the power side (FIGS. 7, 8), or all of the functional blocks 10 or 20 have been replaced by a functional block 100 that is connection-compatible on the power side (FIGS. 9, 10). Advantageously, as is evident from these drawings, the basic structure of the circuit arrangement can be retained, such that the functionality of the circuit arrangement can be increased by degrees by replacing a selectable number of previously known functional blocks 10 or 20 by functional blocks 100 that are connection-compatible on the power side, and in this way it is possible to arrive at an optimum compromise between additional complexity due to additional functional blocks 100 that are connection-compatible on the power side and benefits realized with these functional blocks 100 due to the increase in the degrees of freedom.

FIGS. 8, 9, and 10 each show a rotating field machine with three phase windings 41, 42, 43. This number of phase windings is merely an example. A power electronic circuit arrangement in accordance with the present invention can also be used for controllable, bidirectional energy exchange between an external energy store 30 and a rotating field machine with fewer or more phase windings.

The external energy store 30 is likewise not limited to a storage battery but rather can additionally or alternatively comprise, for example, a fuel cell battery and/or a DC voltage network. Its voltage $U_d$ in the present embodiment is in the range of 200 to 800V.

Figure 5:
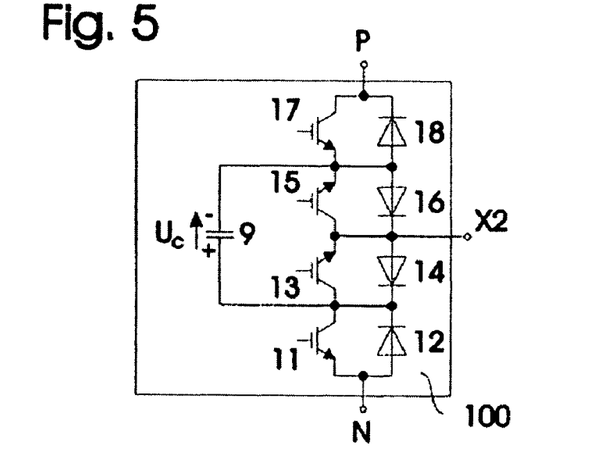
FIG. 5 shows a functional block of a power electronic circuit arrangement, where the functional block is connection-compatible on the power side, in accordance with an embodiment of the present invention.
Figure 6:
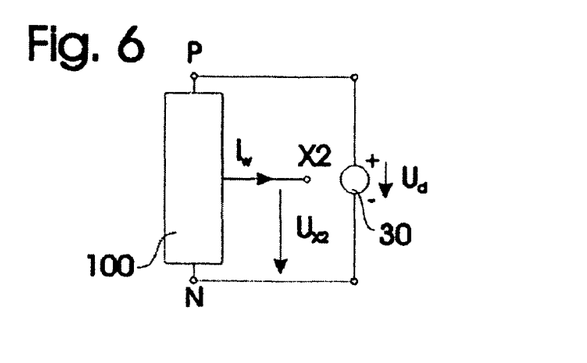
FIG. 6 shows a schematic circuit diagram for FIG. 5.

FIG. 5 shows an embodiment of a functional block 100 that is connection-compatible on the power side. This functional block 100 is used in the circuit arrangements according to FIG. 7, 8, 9, or 10. FIG. 6 shows the associated schematic circuit diagram.

As is apparent from this, the functional block 100 that is connection-compatible on the power side, as it is used in the first embodiment (FIG. 7), the second embodiment (FIG. 8), the third embodiment (FIG. 9), and the fourth embodiment (FIG. 10) of the present invention, comprises a positive terminal P, which can be connected with a positive terminal of the external energy store 30, a negative terminal N, which can be connected with a negative terminal of the external energy store 30, and a load terminal X2, which can be connected with a terminal of a phase winding 41, 42, or 43 of the rotating field machine.

Starting from the negative terminal N (FIG. 5), the functional block 100 that is connection-compatible on the power side comprises four series-connected loops, each with a controllable electronic switch 11, 13, 15, and 17 and a diode 12, 14, 16, and 18. The forward direction of each diode defines a direction of circulation of the respective loop.

A first loop (at the bottom in FIG. 5) with the controllable electronic switch 11 and the diode 12, whose direction of circulation is mathematically positive, is connected with the negative terminal N.

A second loop with the controllable electronic switch 13 and the diode 14, whose direction of circulation is mathematically negative, is connected with the first loop.

A third loop with the controllable electronic switch 15 and the diode 16, whose direction of circulation is likewise mathematically negative, is connected with the second loop.

Finally, a fourth loop (at the top in FIG. 5) with the controllable electronic switch 17 and the diode 18, whose direction of circulation is mathematically positive, is connected with the positive terminal P and with the third loop.

A node, in which the second and third loops are connected with each other, is also connected with the load terminal X2.

In addition, an internal energy store 9 in the form of a unipolar storage capacitor is provided, whose terminals are each connected with a node, in which the first and second loops are connected with each other or in which the third and fourth loops are connected with each other.

Otherwise, the circuitry is as shown in the figures.

$U_{X1}$ designates the output voltage of a prior art functional block 10 or 20 according to FIGS. 3 and 4, and $U_{X2}$ designates the output voltage of a functional block 100 that is connection-compatible on the power side according to FIGS. 5 and 6. Each of these output voltages is defined as a reference potential towards the terminal N.

The voltage of the internal energy store 9 is designated $U_C$ and, as shown in FIG. 5, is defined as positive from the node between the first and second loops to the node between the third and fourth loops.

The controllable electronic switches 11, 13, 15, and 17 are designed as asymmetrically blocking IGBTs (insulated-gate bipolar transistors). The blocking voltage and switching speed of the diodes are adapted to the values of the respective controllable electronic switches. The blocking voltage depends on the voltages $U_C$ and $U_d$ of the internal and external energy stores 9 and 30, respectively, and is higher than that of the diodes 2, 4, 6, and 8.

The switching states which can be produced by the functional block 100 that is connection-compatible on the power side and which are preferentially used in normal operation are listed in Table 1. "0" denotes the off state and "1" the on state of the respective controllable electronic switch 11, 13, 15, or 17. In addition, the output voltage $U_{X2}$ for the respective switching state is given.

Finally, Table 1 gives the resulting change dW/dt of the energy W stored in the functional block 100 that is connection-compatible on the power side for the case of positive charging current, i.e., $i_H > 0$ (similarly, for negative charging current, the opposite sign applies). In this connection, "+1" denotes an increase in this energy, and "−1" denotes a decrease. "0" means that, in the given switching state, there is no change in the energy W stored in the functional block 100 that is connection-compatible on the power side.

TABLE 1

| State No. | Switch 11 | Switch 13 | Switch 15 | Switch 17 | Output Voltage $U_{X2}$ | Internal Energy Store Sign (dW/dt) |
|---|---|---|---|---|---|---|
| 1 | 1 | 0 | 1 | 0 | $-U_C$ | +1 |
| 2 | 1 | 1 | 0 | 0 | 0 | 0 |
| 3 | 0 | 1 | 0 | 1 | $+U_C + U_d$ | −1 |
| 4 | 0 | 0 | 1 | 1 | $+U_d$ | 0 |

The in-house prior art functional block 10 explained earlier with reference to FIG. 3 can produce only the two states "2" and "4" (in which case in Table 1 the switches "11" and "13" are to be replaced by the switches "1" and "3" of functional block 10).

As Table 1 shows, the internal energy store 9 makes it possible to realize an additional switching state "3", in which the output voltage $U_{X2}$ is more positive than the positive terminal of the external energy store 30. Moreover, the internal energy store 9 makes it possible to realize another additional switching state "1", in which the output voltage $U_{X2}$ is more negative than the negative terminal of the external energy store 30. The number of possible output voltage values is thus increased to four.

Naturally, this expanded functionality can also be realized by a functional block that is connection-compatible on the power side with a different layout than that of FIG. 5. In this respect, the only essential feature for the present invention is that this functional block has at least one additional switching state, in which its output voltage $U_{X2}$ is more positive than the positive terminal of the external energy store 30, and/or at least one additional switching state in which its output voltage $U_{X2}$ is more negative than the negative terminal of the external energy store 30, independently of the polarity of the output current (phase winding current). To this end, the functional block 100 that is connection-compatible on the power side includes at least one internal energy store 9.

Therefore, if, in accordance with the invention, a power electronic circuit arrangement comprises at least one functional block of this type which is connection-compatible on the power side, it is possible to realize more efficient operation of the rotating field machine.

For example, in the first embodiment, which is shown in FIG. 7, in which a conventional in-house prior art functional block 10 and a functional block 100 that is connection-compatible on the power side are assigned to a phase winding 41, seven different output voltages can be produced per phase winding, as Table 2 shows.

Table 2 conforms to Table 1 in structure and nomenclature, and $(U_{X1} - U_{X2})$ denotes the output voltage of the phase winding 41. It is clear that there is an increase in the number of possible output voltages, and several switching states are realized in which the output voltage is more positive than the positive terminal or more negative than the negative terminal of the

TABLE 2

| State No. | Switch 1 | Switch 3 | Switch 11 | Switch 13 | Switch 15 | Switch 17 | Output Voltage $(U_{X1} - U_{X2})$ | Internal Energy Store Sign (dW/dt) |
|---|---|---|---|---|---|---|---|---|
| 1 | 0 | 0 | 1 | 0 | 1 | 0 | $+U_C + U_d$ | +1 |
| 2 | 0 | 1 | 1 | 1 | 0 | 0 | $+U_d$ | 0 |
| 3 | 1 | 1 | 0 | 1 | 0 | 1 | $-U_C$ | −1 |
| 4 | 1 | 0 | 0 | 0 | 1 | 1 | 0 | 0 |
| 5 | 1 | 0 | 1 | 0 | 1 | 0 | $+U_C$ | +1 |

TABLE 2-continued

| State No. | Switch 1 | 3 | 11 | 13 | 15 | 17 | Output Voltage $(U_{X1}-U_{X2})$ | Internal Energy Store Sign (dW/dt) |
|---|---|---|---|---|---|---|---|---|
| 6 | 1 | 1 | 1 | 1 | 0 | 0 | 0 | 0 |
| 7 | 0 | 1 | 0 | 1 | 0 | 1 | $-U_C-U_d$ | $-1$ |
| 8 | 0 | 0 | 0 | 0 | 1 | 1 | $-U_d$ | 0 | external energy store 30. This results in more degrees of freedom in the control of the phase winding currents.

The circuit shown in FIG. 7 for a phase winding 41 with a conventional in-house prior art functional block 10 and a functional block 100 that is connection-compatible on the power side can also be realized, for example, with three phase windings 41, 42, 43, as is shown in FIG. 8. In this regard, there is a corresponding increase in the total number of possible switching states for the operation of the rotating field machine. As discussed above, the number of degrees of freedom can thus be systematically increased by replacing a certain number of prior art functional blocks 10 with functional blocks 100 that are connection-compatible on the power side. This results in the advantage that it is possible to realize an optimum compromise between the additional complexity arising from the use of additional functional blocks 100 that are connection-compatible on the power side and the benefits realized as a result of the additional degrees of freedom. For example, FIG. 10 shows a suitable arrangement in which all of the functional blocks are designed as functional blocks 100 that are connection-compatible on the power side.

Preferred arrangements in this respect are arrangements such as the one shown in FIG. 8, in which half of the functional blocks are designed as functional blocks that are connection-compatible on the power side, so that the additional complexity is not too great. FIG. 9 shows another type of preferred arrangement. In this case, although all of the functional blocks are designed as functional blocks that are connection-compatible on the power side, a smaller number of functional blocks is used.

The additional switching states allow significantly more efficient operation, which is especially advantageous in the case of highly utilized rotating field machines, particularly in the case of weaker DC voltage sources 30, which have large voltage tolerances.

In the event of disruptions (for example, short circuit of the external energy store 30 or a drop in the voltage of the external energy store 30 significantly below its rated voltage), all controllable electronic switches 11, 13, 15, and 17 of the functional blocks 100 that are connection-compatible on the power side in the first, second, third, or fourth embodiment are switched off in concert. Uncontrolled overcurrents in the phase windings 41-43 and the resulting high braking torques of the rotating field machine can be avoided in this way. This is true independently of the voltage $U_d$ of the external energy store 30. To this end, it is advantageous for the internal energy store 9 and the associated semiconductors 13, 14, 15, and 16 to be rated sufficiently voltage-proof, which can be fulfilled in customary voltage ranges of, for example, 200 to 800 V, without incurring significant disadvantages.

Tables 1 and 2 give the values for sign (dW/dt). The signs apply to positive polarity of the phase winding current. For negative polarity, the same output voltages apply, but the opposite sign (dW/dt) applies. Knowledge of these energy changes allows automatic control of the voltage $U_C$ of the internal energy store 9 to a predetermined set value. In the specific embodiment in question, this set value is proportional to the rotational speed of the rotating field machine. A set value approximately equal to zero is thus obtained in the event of shutdown or low rotational speeds. Current ripples are thus minimized in these operating states. In addition, it is not necessary to precharge the capacitor of the internal energy store 9.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A power electronic circuit arrangement with functional blocks for controllable, bidirectional energy transfer between a rotating field machine with at least one phase winding, and an external energy store having a positive terminal and a negative terminal, the arrangement comprising functional blocks, said functional blocks comprising at least one functional block that can be connected across the terminals of the external energy store and having at least one internal energy store providing at least one of a switching state in which an output voltage is more positive than the positive terminal of the external energy store, and a switching state in which an output voltage is more negative than the negative terminal of the external energy store.

2. The power electronic circuit arrangement of claim 1 wherein the output voltage is more negative than the negative terminal of the external energy store, independently of the polarity of current in the phase winding.

3. The power electronic circuit arrangement of claim 1 wherein at least half of said functional blocks have at least one internal energy store providing at least one of a switching state in which an output voltage is more positive than the positive terminal of the external energy store, and a switching state in which an output voltage is more negative than the negative terminal of the external energy store.

4. The power electronic circuit of claim 1 wherein the internal energy store has a voltage that is subject to control as a function of at least one of speed and torque of the rotating field machine.

5. The power electronic circuit of claim 1 wherein the internal energy store has a permissible voltage which is selected so that, in the event of at least one of a short circuit and undervoltage of the external energy store, uncontrolled braking of the rotating field machine does not occur.

6. The power electronic circuit of claim 1 wherein said at least one functional block having an internal energy store has at least four possible output voltage values.

7. The power electronic circuit of claim 1 wherein the internal energy store comprises a unipolar storage capacitor.

8. The power electronic circuit of claim 1 wherein said at least one functional block having an internal energy store comprises a controllable electronic switch, wherein the controllable electronic switch at least one of an asymmetrically blocking IGBT and a reverse conducting component, said reverse conducting component comprising at least one of a MOSFET and a CoolMOS.

9. The power electronic circuit of claim 1 wherein said at least one functional block having an internal energy store comprises first, second, third, and fourth loops which are connected in series, wherein
 each loop has a controllable electronic switch and a diode defining a direction of circulation;
 the first and second loops have opposite directions of circulation;
 the third and fourth loops have opposite directions of circulation;
 the second and third loops have the same direction of circulation;
 the internal energy store is connected in parallel to the second and third loops;
 the first loop can be connected to the negative terminal of the external energy store;
 the fourth loop can be connected to the positive terminal of the external energy store; and
 the second and third loops can be connected to a phase winding of the rotating field machine.

10. A rotating field machine with at least one phase winding connected with an external energy store having a positive terminal and a negative terminal for controllable, bidirectional energy exchange, the machine comprising a power electronic circuit comprising a plurality of functional blocks connected across the terminals of the external energy store, said functional blocks comprising at least one functional block having an internal energy store providing at least one of a switching state in which an output voltage is more positive than the positive terminal of the external energy store, and a switching state in which an output voltage is more negative than the negative terminal of the external energy store.

11. The rotating field machine of claim 10 wherein the external energy store is one of a DC voltage source and a DC voltage network.

12. The rotating field machine of claim 10 wherein the external energy store comprises at least one of a fuel cell and a storage battery.

13. The rotating field machine of claim 10 wherein the machine is a permanently excited, brushless synchronous motor.

14. The rotating field machine of claim 13 wherein the internal energy store has a voltage that is subject to closed loop control as a function of at least one of speed and torque of the rotating field machine.

15. The rotating field machine of claim 13 wherein the internal energy store has a voltage that is subject to open loop control as a function of at least one of speed and torque of the rotating field machine.

16. A method for controlling bidirectional energy exchange between a rotating field machine and an external energy store having a positive terminal and a negative terminal,
 said method utilizing a power electronic circuit comprising:
  a plurality of functional blocks connected across the terminals of the external energy store, said functional blocks comprising at least one functional block having an internal energy store configured to provide at least one of:
   a switching state in which an output voltage is more positive than the positive terminal of the external energy store and
   a switching state in which an output voltage is more negative than the negative terminal of the external energy store,
 said method comprising:
  providing the output voltage that is at least one of:
   more positive than the positive terminal of the external energy store and
   more negative than the negative terminal of the external energy store; and
  controlling a voltage of the internal energy store to a desired value automatically.

17. The method of claim 16 wherein the desired value varies according to at least one of rotational speed and torque of the machine.

18. The method of claim 17, further comprising controlling the desired value so that the desired value approaches zero as the rotational speed approaches zero.

19. The method of claim 16 wherein the desired value equals $\Sigma(c_i \times N^i)$, where N is the rotational speed or the torque of the rotating field machine, and $c_i$ (i=1 . . . n) represents constant real numbers.

* * * * *